United States Patent
Lambert et al.

(10) Patent No.: US 9,188,495 B2
(45) Date of Patent: Nov. 17, 2015

(54) STRAIN SENSING CABLE

(71) Applicants: Christopher Lambert, Blacksburg, VA (US); Ajit Balagopal, Christiansburg, VA (US); Jonas Ivasauskas, Blacksburg, VA (US)

(72) Inventors: Christopher Lambert, Blacksburg, VA (US); Ajit Balagopal, Christiansburg, VA (US); Jonas Ivasauskas, Blacksburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 209 days.

(21) Appl. No.: 13/705,301

(22) Filed: Dec. 5, 2012

(65) Prior Publication Data

US 2014/0150563 A1 Jun. 5, 2014

(51) Int. Cl.
*G01L 1/24* (2006.01)
*G01M 5/00* (2006.01)
*G01M 11/08* (2006.01)

(52) U.S. Cl.
CPC .............. *G01L 1/246* (2013.01); *G01M 5/0025* (2013.01); *G01M 5/0041* (2013.01); *G01M 5/0091* (2013.01); *G01M 11/086* (2013.01); *Y10T 29/49826* (2015.01); *Y10T 29/49925* (2015.01)

(58) Field of Classification Search
CPC ........... G01L 1/24; G01L 1/242; G01L 1/246; G01K 11/32; G01M 11/086; H01B 7/32
USPC ........................................................... 73/800
See application file for complete search history.

(56) References Cited

U.S. PATENT DOCUMENTS

| | | | | |
|---|---|---|---|---|
| 6,706,348 | B2* | 3/2004 | Quigley et al. | 428/36.3 |
| 6,999,641 | B2* | 2/2006 | Williams et al. | 385/12 |
| 7,003,184 | B2* | 2/2006 | Ronnekleiv et al. | 385/12 |
| 8,315,486 | B2* | 11/2012 | Pearce et al. | 385/13 |
| 2005/0234648 | A1 | 10/2005 | Economides et al. | |
| 2009/0074348 | A1 | 3/2009 | Xia et al. | |
| 2011/0311179 | A1 | 12/2011 | Greenaway | |
| 2012/0082422 | A1* | 4/2012 | Sarchi et al. | 385/101 |
| 2012/0143521 | A1 | 6/2012 | Chen et al. | |

FOREIGN PATENT DOCUMENTS

JP 2007271513 A 10/2007

OTHER PUBLICATIONS

AFL Global, [online]; [retrieved on Jan. 10, 2013]; retrieved from the Internet http://www.aflglobal.com/Products/Fiber-Optic-Cable/Downhole.aspx, "Downhole" AFL Global, 2p.
International Search Report and Written Opinion for PCT Application No. PCT/US2013/068060, dated Jan. 29, 2014, pp. 1-13.

* cited by examiner

*Primary Examiner* — Lisa Caputo
*Assistant Examiner* — Octavia Hollington
(74) *Attorney, Agent, or Firm* — Cantor Colburn LLP

(57) ABSTRACT

A strain sensing cable including one or more strain sensing elements and a strain transfer medium extruded directly onto the one or more strain sensing elements disposed within the strain transfer medium. The strain transfer medium is operatively arranged to transfer strain experienced by the cable to the one or more strain sensing elements. A method of making a strain sensing cable is also included.

17 Claims, 1 Drawing Sheet

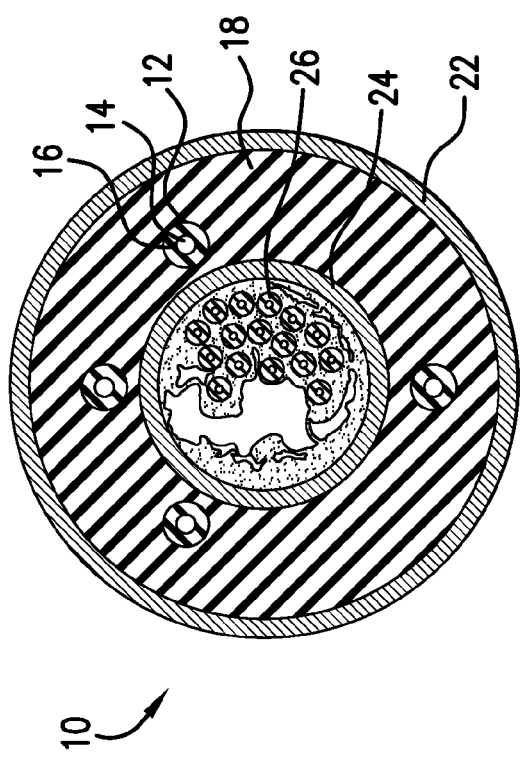
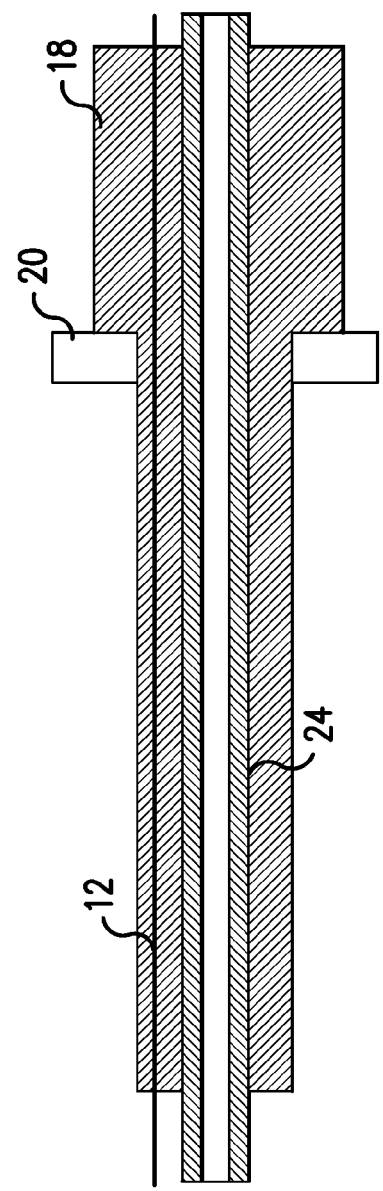
FIG.1
FIG.2

STRAIN SENSING CABLE

BACKGROUND

Cables, particularly fiber optic cables, are used ubiquitously in the downhole drilling and completions industry. These cables are often disposed with a tubular string or other downhole component and used for enabling a variety of downhole conditions and parameters, such as temperature, vibration, sound, pressure, strain, etc. to be sensed and/or monitored. In order to increase efficiency and reduce costs in installation, use, and manufacture, the industry always well receives advances in sensing technology and alternate styles of sensing and monitoring cables.

SUMMARY

A strain sensing cable including one or more strain sensing elements; and a strain transfer medium extruded directly onto the one or more strain sensing elements disposed within the strain transfer medium, the strain transfer medium operatively arranged to transfer strain experienced by the cable to the one or more strain sensing elements.

A method of making a strain sensing cable including positioning one or more strain sensing elements with respect to a strain transfer medium; and extruding the strain transfer medium through a die directly onto the one or more strain sensing elements with the one or more strain sensing elements disposed in the strain transfer medium.

BRIEF DESCRIPTION OF THE DRAWINGS

The following descriptions should not be considered limiting in any way. With reference to the accompanying drawings, like elements are numbered alike:

FIG. 1 is a cross-sectional view of a cable according to one embodiment disclosed herein; and FIG. 2 schematically illustrates an extrusion process for forming a cable according to one embodiment disclosed herein.

DETAILED DESCRIPTION

A detailed description of one or more embodiments of the disclosed apparatus and method are presented herein by way of exemplification and not limitation with reference to the Figures.

Referring now to FIG. 1, a cross-section of a cable 10 is shown, having at least one strain sensing element 12, with the strain sensing elements 12 in turn having features that enable strain to be sensed, such as fiber Bragg gratings. In the illustrated embodiment, the elements 12 are each formed with a fiber optic core 14 surrounded by a protective sheath, cladding, or coating 16. The fiber optic core 14 may have any desired construction, e.g., that of a typical waveguide having a higher refractive index core surrounded by a lower refractive index material (e.g., glass), which are then covered by the coating 16 for additional mechanical protection. The fiber optic cores 14 are each arranged, for example, with the aforementioned fiber Bragg gratings or some other feature that enables the elements 12 to sense one or more parameters, particularly strain. In one embodiment, the fiber Bragg gratings or other sensing features enable distributed strain sensing along the length of the elements 12. In one embodiment, the cable 10 includes at least three sensing elements 12 in order to enable triangulation of the sensed strain, thereby enhancing the accuracy and performance of the cable 10. The coating 16 could comprise one more layers of suitable protective materials such as polyimide, polyether ether ketone (PEEK), polyvinyl chloride (PVC), etc., which are typically applied in liquid form cured onto the fiber cores 14.

The sensing elements 12 are particularly arranged for sensing strain experienced by the cable 10 which is representative of the strain in a component with which the cable 10 is arranged. In one embodiment the component for which strain is sensed by the cable 10 is a tubular string or other downhole component. The cable 10 could be mounted or affixed in any desired way, with some suitable examples provided by United States Patent Publication No. 2008/0271926 (Coronado et al.), which Publication is hereby incorporated by reference in its entirety.

In order to enable the sensing elements 12 to accurately sense strain, the elements 12 are disposed in a strain transfer medium 18. More specifically, as shown schematically in FIG. 2, the medium 18 is extruded directly onto the sensing elements 12 or, alternatively stated, the sensing elements 12 are positioned directly within the medium 18, during extrusion of the medium 18 through a die 20. The medium 18 could be forced through the die 20 in any suitable manner, such as by a ram, press, hydraulic pressure, etc. The extrusion process could place the medium 18 into its final shape for use in the cable 10 or a preliminary shape that is further processed to form the cable 10. The medium 18 could be any suitable material that is able to be extruded directly onto the sensing elements 12, such as a plastic, polymer, elastomer, or combination thereof. In one embodiment, the medium 18 is a thermoplastic polyester elastomer commercially available from DuPont under the trade name Hytrel®. It has been found by the current inventors that extruding the medium 18 directly onto and/or with the sensing elements 12 results in a cable that is not only quickly and efficiently manufacturable, but also has improved strain sensing capabilities with respect to prior cables.

In order to generally protect the cable 10 during installation and use, a cover, jacket, sheath, outer cover, or cladding 22 is provided. The cladding 22 can be any suitable material that provides protection to the sensing elements 12 and the medium 18, such as crush or compression, abrasion, and chemical reactivity resistance. In one embodiment, the cladding 22 is made from a stainless steel tube having radial dimensions larger than the medium 18, which is drawn down to tightly encase the medium 18. Of course, the cladding 22 could be assembled according to other methods, such as wrapping or bending a sheet about the medium 18, etc., or from other materials.

In the illustrated embodiment, the cable 10 also includes a tube or other structural member 24. The member 24 in the illustrated embodiment is hollow in order to house one or more additional fibers or elements 26. Of course, the member 24 could be arranged with a solid cross-section and/or be arranged for some other purpose such as to provide desired rigidity, ductility, resiliency, or other properties to the cable 10. As shown in FIG. 2, the member 24 can be directly extruded with the medium 18. The elements 26 can be added to the member 24 after the extrusion of the medium 18 thereon. In one embodiment, the additional elements 26 are arranged with the member 24 according to known Fiber In Metal Tube (FIMT) techniques. By placing the additional elements 26 inside of the member 24, the elements 26 can be further protected from harsh environments, being crushed or bent, etc. Placement in the member 24 also isolates the elements 26 from the medium 18 such that the elements 26 are not subjected to the strain experienced by the cable 10. In this way, the elements 26 can be arranged for sensing parameters other than strain, such as temperature, acoustics, etc. It is also to be appreciated that while the elements 26 could be sensing elements such as fiber optic strands, other signal, sensing, and/or electrical power conductors could be included.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A strain sensing cable comprising:
   one or more strain sensing elements; and
   a strain transfer medium extruded directly onto the one or more strain sensing elements disposed within the strain transfer medium, the strain transfer medium operatively arranged to transfer strain experienced by the cable to the one or more strain sensing elements; and
   a structural member encased in the strain transfer medium adjacent the one or more strain sensing elements, wherein the structural member is configured and disposed to provide at least one of a selected rigidity, ductility and resiliency for the strain sensing cable.

2. The cable of claim 1, wherein the one or more strain sensing elements comprises one or more optic fibers.

3. The cable of claim 2, wherein the one or more optic fibers each comprise a fiber optic core coated by a protective sheath.

4. The cable of claim 2, wherein the one or more optic fibers include fiber Bragg gratings for enabling the one or more optic fibers to sense strain.

5. The cable of claim 1, wherein each of the one or more strain sensing elements is arranged to provide distributed strain sensing over a length thereof.

6. The cable of claim 1, wherein the one or more strain sensing elements includes at least three strain sensing elements for enabling triangulation.

7. The cable of claim 1, wherein the strain transfer medium is a polymer, elastomer, plastic, or a combination including at least one of the foregoing.

8. The cable of claim 1, wherein the strain transfer medium is a thermoplastic polyester elastomer.

9. The cable of claim 1, wherein the structural member is hollow and contains one or more other sensing elements therein.

10. The cable of claim 9, wherein the one or more other elements are operatively arranged to sense parameters other than strain and the structural member isolates the one or more other elements from strain experienced by the cable.

11. The cable of claim 1, further comprising a cladding surrounding the strain transfer medium.

12. A method of making a strain sensing cable comprising:
    positioning one or more strain sensing elements with respect to a strain transfer medium;
    extruding the strain transfer medium through a die directly onto the one or more strain sensing elements with the one or more strain sensing elements disposed in the strain transfer medium; and
    positioning a structural member adjacent to the one or more strain sensing elements and extruding the strain transfer medium directly onto the structural member and the one or more strain sensing elements, the structural member providing at least one of a selected rigidity, ductility and resiliency for the strain sensing cable.

13. The method of claim 12, further comprising encasing the strain transfer medium with an outer cladding.

14. The method of claim 13, wherein encasing the strain transfer medium includes drawing the outer cladding to tightly encase the strain transfer medium.

15. The method of claim 12, wherein the structural member is hollow, the method further comprising disposing one or more other sensing or conductive elements within the structural member.

16. The method of claim 12, wherein the strain sensing medium is a thermoplastic polyester elastomer.

17. The method of claim 12, wherein the one or more strain sensing elements are one or more optic fibers.

* * * * *